United States Patent Office

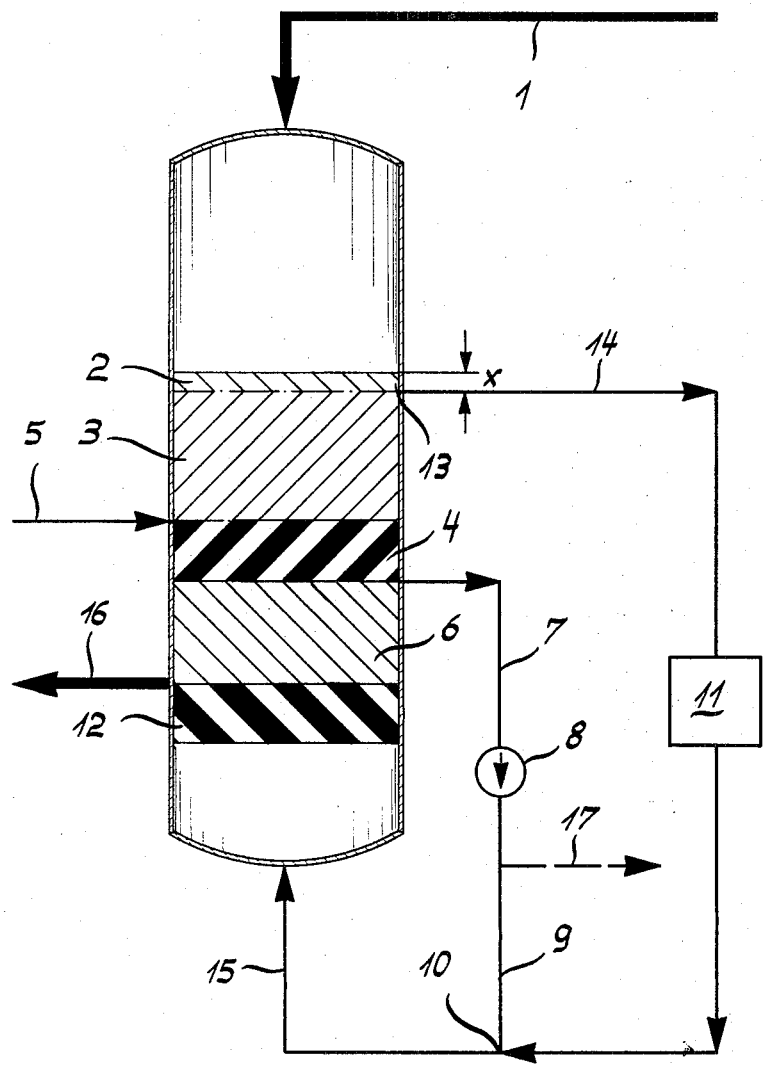

3,846,298
Patented Nov. 5, 1974

3,846,298
METHOD OF TREATING (REGENERATING) USED UP ION EXCHANGE PARTICLES
Georg Plura, Bergneustadt, Germany, assignor to L. & C. Steinmuller G.m.b.H., Gummersbach, Germany
Filed Dec. 18, 1972, Ser. No. 316,360
Claims priority, application Germany, Dec. 21, 1971,
P 21 63 346.5
Int. Cl. B01d 15/06
U.S. Cl. 210—33            3 Claims

ABSTRACT OF THE DISCLOSURE

A method of treating (regenerating) used up ion exchange particles. According to this method, the ion exchange particles to be treated form a bed having nearly constant volume and, during the regenerating phase, do not change their location within the bed. Nearly equal volumetric portions of regenerated ion exchange particles as well as used up ion exchange particles are continuously carried off from and supplied to the bed respectively, and the bed is simultaneously treated with at least three fluid streams. The treatment of the used up ion exchange particles is carried out in a bed comprising primary sections. Preliminary regeneration is effected in the lower bed section by means of a partially used-up fluid stream composed of regenerating medium, finishing regeneration is effected in the bed section above the middle or next lower bed section by means of a fluid stream composed of regenerating chemical and washing fluid, and washing out is effected in the upper bed section by means of a fluid stream composed of washing fluid. The ion exchange particles, along with the fluid stream composed of regenerating chemical and washing fluid, are drawn off together near the boundary zone between the two middle bed sections. The withdrawn fluid stream, after the addition of used up ion exchange particles, is again supplied to the lower or preliminary regenerating bed section, and in the boundary zone between the preliminary regenerating bed section and the middle bed section, is withdrawn in almost completely reacted condition. At the same time, the fluid stream consisting of wash fluid, after entering into the additional upper bed section consisting of regenerated ion exchange particles, takes over the discharge of regenerated ion exchange particles by means of a partial stream, and the bed in its entirety moves counter to the direction of flow of the wash fluid and the regenerating chemical as a result of the pressure differential between the bottom two bed sections and the upper bed sections.

---

The present invention relates to a method of treating (regenerating) used up ion exchange particles. According to this method, the ion exchange particles to be treated form a bed having nearly constant volume and, during the regenerating phase, do not change their location within the bed. Nearly equal volumetric portions of regenerated ion exchange particles as well as used up ion exchange particles are continuously carried off from and supplied to the bed respectively, and the bed is simultaneously treated with at least three fluid streams. A practical application of this method is described for example in U.S. patent application, Ser. No. 245,481.

In order to obtain the continuity of the method, the heretofore known methods for continuous treatment of ion exchange particles are bound or limited on the one hand by a definite bed form and on the other hand by a definite bed construction.

According to one heretofore known method for continuous treatment of ion exchange particles, a whirl bed is used to which the regenerating medium is added from beneath through poured filling material. The regenerated ion exchange particles are carried off through the poured filling material through discharge pipes, and are conveyed into a loading column through a plurality of interposed auxiliary devices. Corresponding to the withdrawal of regenerated ion exchange particles, used up ion exchange particles are simultaneously supplied to the whirl bed. As a result of the use of a whirl bed, a large expense for apparatus is necessary. Such expense is reflected not only in a very slender loading or take up column, but also in a large regenerating column. Aside from these drawbacks, the maximum approximation of the desired regeneration to a sufficient extent is attainable with the bed form which is used in this method only if very slender and very tall regenerating columns are used.

A further method for continuous regeneration of ion exchange particles is known, with which the used up exchange particles are conveyed to the device from below by means of a pump arranged directly in the transport circuit or cycle. The drawbacks inherent to this known method consist primarily in that the resin delivery pumps, which assure the continuity of the method, require an addition of magnetized particles to the ion exchange particles. Without such an addition, the ion exchange particles splinter or shatter during the course of the method, and a steadily increasing pressure loss results, so that interruptions in operation are unavoidable.

It is an object of the present invention to provide a method for continuously treating (regenerating) ion exchange particles, according to which, by means of the construction of the bed and by variation of the pressure conditions in the individual bed sections by simultaneous withdrawal of regenerated and supply of charged ion exchange particles respectively in nearly equal volumetric portions, the ion exchange bed is continuously moved counter to the direction of flow of a treating fluid.

This object and other objects and advantages of the invention will appear more clearly from the following specification in connection with the accompanying drawing which schematically illustrates a specific embodiment of a device or apparatus for carrying out the method according to the invention.

The method according to the present invention is characterized primarily in that the treatment of the used up ion exchange particles is carried out in a bed comprising primary sections. The invention is further characterized in that the preliminary regeneration is effected in the lower bed section by means of a partially used-up fluid stream composed of regenerating medium, the finishing regeneration is effected in the bed section above the middle or next lower bed section by means of a fluid stream composed of regenerating chemical and washing fluid, and the washing out is effected in the upper bed section by means of a fluid stream composed of washing fluid. The ion exchange particles, along with the fluid stream composed of regenerating chemical and washing fluid, are drawn off together near the boundary zone between the two middle bed sections. The withdrawn fluid stream, after the addition of used up ion exchange particles, is again supplied to the lower or preliminary regenerating bed section and, in the boundary zone between the preliminary regenerating bed section and the middle bed section, is withdrawn in almost completely reacted condition. At the same time, the fluid stream consisting of wash fluid, after entering into the additional upper bed section consisting of regenerated ion exchange particles, takes over the discharge of regenerated ion exchange particles by means of a partial stream, and the bed in its entirety moves counter to the direction of flow of the wash fluid and the regenerating chemical as a result of the pressure differential between the bottom two bed sections and the upper bed sections.

The above described method according to the invention may also, without straying from the principles of the invention, be practiced in such a way that a part of the fluid stream composed of regenerating chemical and wash fluid be withdrawn, and the remainder of the stream, after the addition of used up ion exchange particles, be supplied to the bed section, and that a pump be arranged in the circuit of the fluid stream composed of regenerating medium and wash fluid.

The advantage obtained with the method according to the invention consists primarily in that the ion exchange particles may be continuously treated. In this connection, especially in contrast to the heretofore known methods, no whirl bed is necessary. Rather, the method operates in a so-called compact free-floating bed, for which no fixed boundaries or limits are necessary at the top or bottom; instead, by means of the pressure differentials in the individual bed sections, the bed is continuously moved. The method according to the invention does not require a large expense for apparatus and extra auxiliary devices.

The method according to the invention as described in the specification provides for supplying the treated wash fluid from above and the ion exchange particles to be regenerated from below. It is also possible to reverse the method, that is, to supply the wash fluid from below and the ion exchange particles which are to be regenerated from above. Accordingly, the other connections must be correspondingly transposed.

Referring now to the drawing in detail, the wash fluid flows first through bed section 2 as main stream 1, and then as a partial stream through bed section 3. The wash fluid then arrives in the bed section 4 and mixes with the fresh chemical which is injected through the conduit 5, and is withdrawn in the boundary region to the middle bed section 6. A partial stream, which still contains residual chemicals, is withdrawn through conduit 7 and, by means of a feed or delivery pump 8 and a conduit 9, is supplied from below upwardly counter current to the main stream 1.

The basic substance of the bed consists of a homogeneous ion exchange material which is commercially obtainable from chemical companies. The ion exchange particles are activated synthetic particles which bring about the reactions.

In view of a sufficiently high pressure differential between the bed sections 12, 6 and the bed sections 3, 4, the bed in its entirety moves upwardly counter current to the direction of flow of the main stream 1 and the chemical 5. When the bed section 3 exceeds the fixed height 13, the regenerated ion exchange particles are continuously withdrawn by means of a partial stream of the wash fluid through conduit 14 to a loading column 11. The loading column 11 may, for example, be of the type described in the U.S. application Ser. No. 245,481, which sets forth a method of continuously treating fluids with ion exchange particles. The loaded or charged ion exchange particles are carried out of the loading column 11 through conduits 18, 15 in an upward stream into the bed section 12. Nearly the same volumes, which are withdrawn in the form of regenerated ion exchange particles as a partial stream through conduit 14, are added at point 10 to the fluid stream coming from conduit 9, and are conveyed from below through conduit 15 to the bed section 12. The excess chemicals inevitably still in the partial stream of conduit 7 are used in the bed section 12 for preliminary regeneration of the charged ion exchange particles and are withdrawn at 16 after being almost completely reacted.

It is also possible to withdraw a partial stream from the fluid stream in conduit 7 through the conduit 17 for a particular application.

The movement of the ion exchange bed in its entirety may be continuously subjected to brief changes.

It may also be added that the main stream 1 for conveying wash fluid may be a partial withdrawal of finished fluid from the loading column 11, where unrefined fluid is refined or treated.

It may also be mentioned that in a cation stage the regenerating chemicals generally consist of a hydrochloric acid solution, a sulfuric acid solution, or a sodium chloride solution. In the anion stage, the regenerating chemicals generally consist of soda lye or a solution of caustic soda.

It is, of course, to be understood that the present invention is by no means limited to the specific showing in the drawing but also comprises any modifications within the scope of the appended claims.

What I claim is:

1. A method of continuously treating used up ion exchange particles according to which the ion exchange particles to be treated form a bed having nearly constant volume and comprising at least a first bed section, a second bed section, and a third bed section, a fourth bed section, and a fifth bed section, said bed sections being consecutively arranged upon each other, which includes the steps of: supplying used up ion exchange particles to said fifth bed section for preliminary regeneration; adding regenerating medium to said bed at the boundary zone between said second second and third bed sections for regenerating used up ion exchange particles; adding wash fluid to said first bed section for washing out regenerated ion exchange particles; withdrawing from the boundary zone between said third and fourth bed sections a fluid stream comprising ion exchange particles, regenerating medium, and wash fluid; adding used up ion exchange particles to said fluid stream; supplying said fluid stream and said added used up ion exchange particles to said fifth bed section; withdrawing spent regenerating medium and wash fluid from the boundary zone between said fourth and fifth bed sections; and withdrawing regenerated ion exchange particles from between said first and second bed sections with a partial stream of said wash fluid, the above steps creating a pressure differential between said fourth and fifth bed sections and said first, second, and third bed sections, thereby causing said bed in its entirety to move counter to the direction of flow of said wash fluid.

2. A method of continuously treating used up ion exchange particles according to claim 1, which includes the steps of using said withdrawn regenerated ion exchange particles in a loading column and supplying said added used up ion exchange particles from a loading column.

3. A method of continuously treating used up ion exchange particles according to claim 1, which includes the steps of withdrawing a portion of said fluid stream before the addition of additional used up ion exchange particles.

References Cited
UNITED STATES PATENTS

| | | | |
|---|---|---|---|
| 3,660,283 | 5/1972 | Ryan | 210—33 |
| 3,607,740 | 9/1971 | Akeroyd et al. | 210—33 |

FRANK A. SPEAR, Jr., Primary Examiner

I. CINTINS, Assistant Examiner

U.S. Cl. X.R.

210—34

UNITED STATES PATENT OFFICE
CERTIFICATE OF CORRECTION

Patent No. 3,846,298                Dated November 5, 1974

Inventor(s) Georg Plura

It is certified that error appears in the above-identified patent and that said Letters Patent are hereby corrected as shown below:

Column 4, line 28, "between said second second and third bed sections for" should read -- between said second and third bed sections for --.

Signed and sealed this 7th day of January 1975.

(SEAL)
Attest:

McCOY M. GIBSON JR.　　　　　　　C. MARSHALL DANN
Attesting Officer　　　　　　　　Commissioner of Patents